(12) United States Patent
Cottier

(10) Patent No.: US 9,328,761 B2
(45) Date of Patent: May 3, 2016

(54) FASTENER

(71) Applicant: James Hardie Technology Limited, Dublin (IE)

(72) Inventor: John Cottier, Sydney (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/374,894

(22) PCT Filed: Jan. 25, 2013

(86) PCT No.: PCT/EP2013/051466
§ 371 (c)(1),
(2) Date: Jul. 25, 2014

(87) PCT Pub. No.: WO2013/110775
PCT Pub. Date: Aug. 1, 2013

(65) Prior Publication Data
US 2015/0037118 A1    Feb. 5, 2015

(30) Foreign Application Priority Data
Jan. 27, 2012    (GB) .................................... 1201381

(51) Int. Cl.
*A47G 3/00* (2006.01)
*F16B 35/06* (2006.01)
(Continued)

(52) U.S. Cl.
CPC ................. *F16B 35/06* (2013.01); *B23P 19/04* (2013.01); *F16B 37/14* (2013.01); *F16B 41/005* (2013.01); *Y10T 29/49963* (2015.01)

(58) Field of Classification Search
CPC ........... A47G 3/00; F16B 15/02; F16B 35/06; F16B 37/14

USPC ............ 411/372.5, 372.6, 373, 383, 429, 431
See application file for complete search history.

(56) References Cited

U.S. PATENT DOCUMENTS

| 294,524 A | * | 3/1884 | Stiemke | ......................... 411/374 |
| 1,194,792 A | * | 8/1916 | Stewart | ......................... 411/338 |

(Continued)

FOREIGN PATENT DOCUMENTS

| DE | 453 048 C | 11/1927 |
| DE | 31 13 831 A1 | 2/1982 |

(Continued)

OTHER PUBLICATIONS

International Search Report and Written Opinion for corresponding PCT Application No. PCT/EP2013/051466, filed Jan. 25, 2013, dated Mar. 28, 2013, 12 pages.

(Continued)

*Primary Examiner* — Roberta Delisle
(74) *Attorney, Agent, or Firm* — Knobbe, Martens, Olson & Bear, LLP

(57) ABSTRACT

An improved fastener comprising: a screw element (1) and a cover member (11). The screw element (1) comprising a shank member (2) having comprising a piercing tip (6) at a first end of the shank member and a head (7) at a second end of the shank member. The head of the screw comprising a first recess (9) for releasably engaging an instrument of rotation and a second recess (10) extending from the first recess into the shank member for releasably engaging a shank portion (14) of a cover member (11). The cover member (11) comprising a capping portion (12) having a first face (13), a second face (17) and a shank portion (14) extending substantially orthogonally from the first face (13) of the capping portion (12), the shank portion (14) being releasably engagable with the second recess (10) of the screw element (1).

11 Claims, 6 Drawing Sheets

(51) Int. Cl.
 *F16B 37/14* (2006.01)
 *F16B 41/00* (2006.01)
 *B23P 19/04* (2006.01)

(56) References Cited

U.S. PATENT DOCUMENTS

| | | | | |
|---|---|---|---|---|
| 2,627,778 | A | * | 2/1953 | Hodell ........................ 411/372.6 |
| 2,771,262 | A | * | 11/1956 | Laystrom ....................... 248/489 |
| 3,449,988 | A | | 6/1969 | Gallo, Sr. |
| 5,391,028 | A | * | 2/1995 | Charles ........................... 411/374 |
| 5,603,472 | A | | 2/1997 | Hutter, III |
| 5,788,442 | A | * | 8/1998 | Eder .............................. 411/373 |
| 5,826,907 | A | | 10/1998 | Saito et al. |
| 6,302,630 | B1 | | 10/2001 | Grant |
| 6,886,431 | B1 | | 5/2005 | Petrsorich |
| 2008/0286071 | A1 | | 11/2008 | Potter |
| 2010/0247270 | A1 | * | 9/2010 | Cao ............................... 411/432 |

FOREIGN PATENT DOCUMENTS

| | | |
|---|---|---|
| EP | 1 662 055 A2 | 5/2006 |
| EP | 2 224 114 A1 | 9/2010 |
| GB | 464208 A | 4/1937 |
| GB | 2498769 | 7/2013 |
| NL | 1 021 312 C2 | 2/2004 |
| WO | WO 2013/110775 | 8/2013 |

OTHER PUBLICATIONS

Search Report for Great Britain Application No. GB1201381.9, dated May 16, 2012, 3 pages.
Examination Report for Great Britain Application No. GB1201381.9, dated Jan. 24, 2014, 3 pages.
International Preliminary Report on Patentability and Written Opinion for corresponding PCT Application No. PCT/EP2013/051466, filed Jan. 25, 2013, dated Jul. 29, 2014, 7 pages.

* cited by examiner

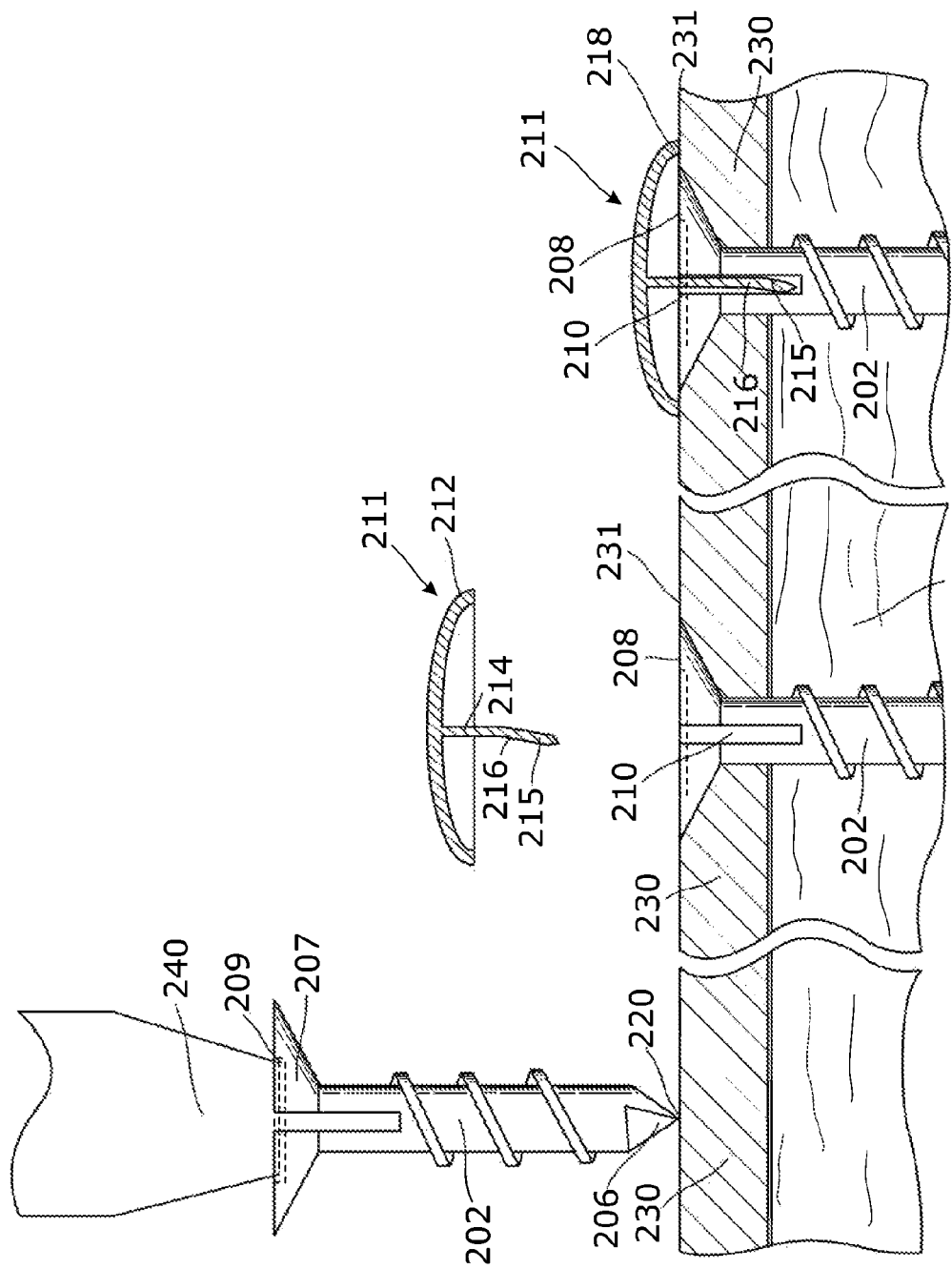

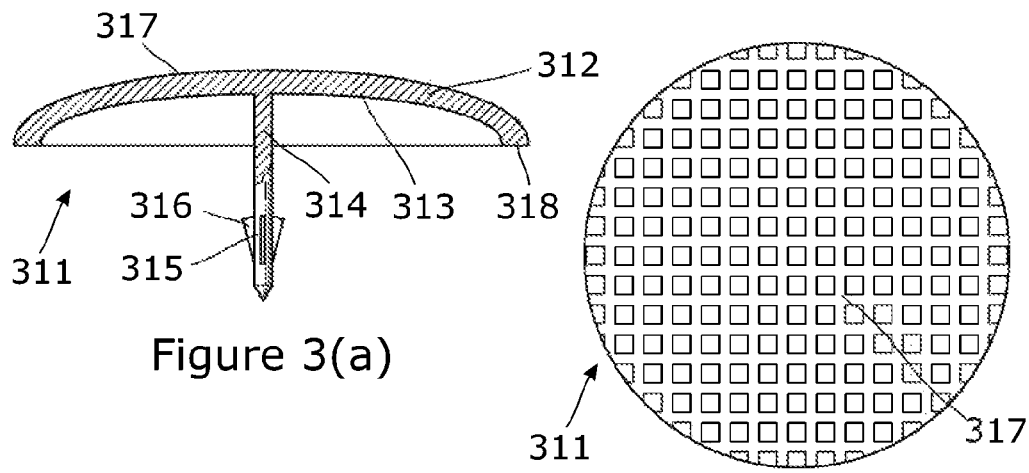
Figure 3(a)
Figure 3(c)
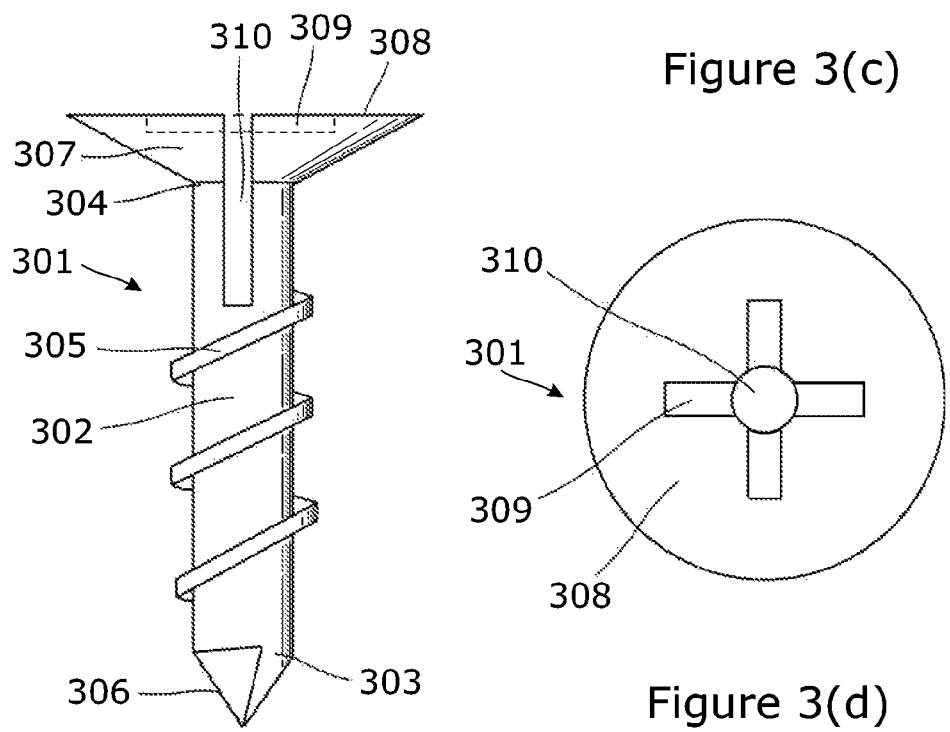
Figure 3(b)
Figure 3(d)

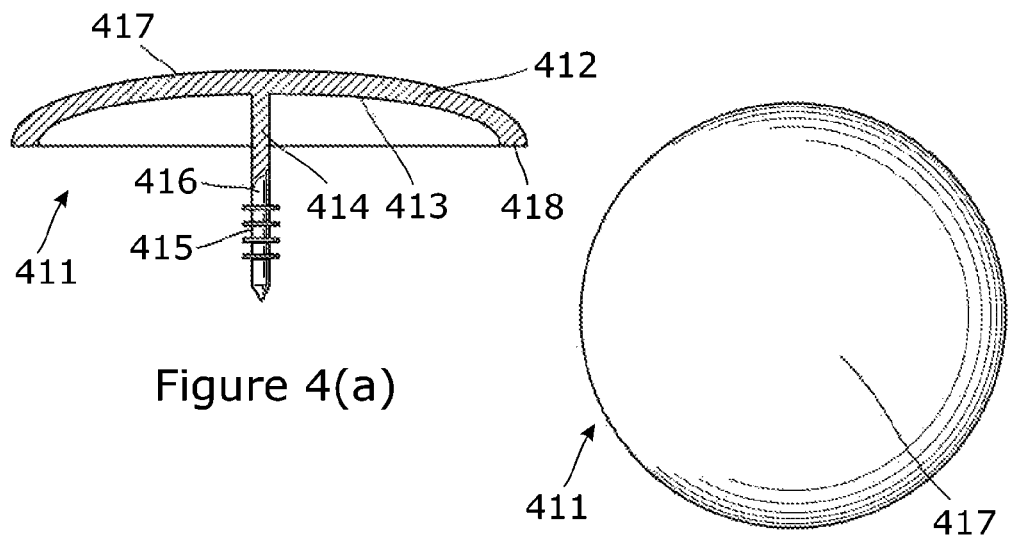
Figure 4(a)
Figure 4(c)
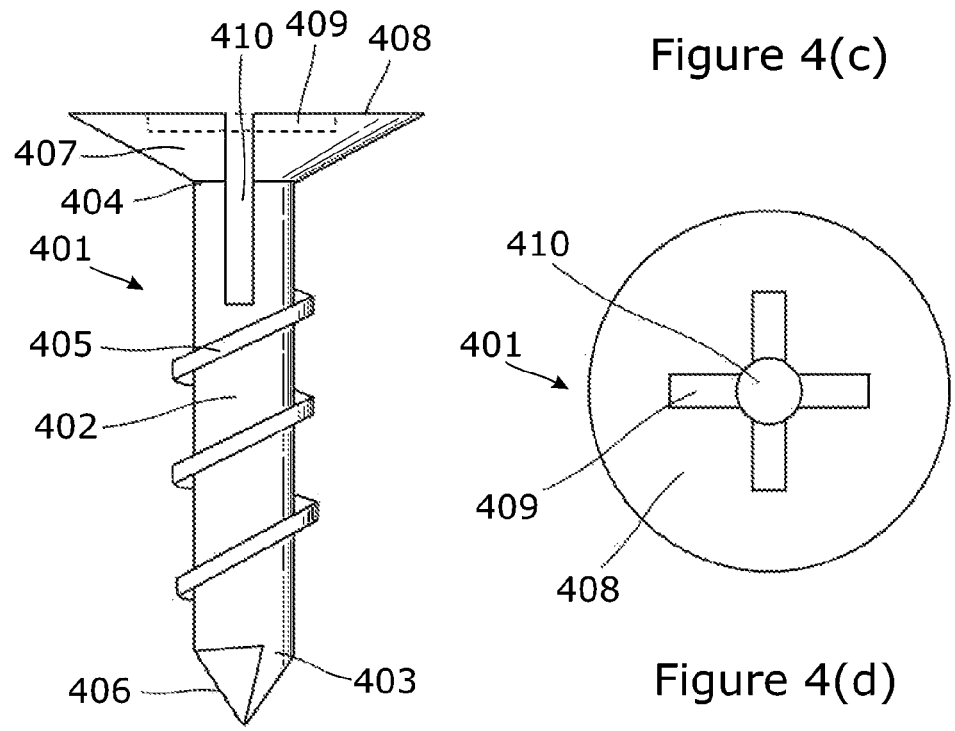
Figure 4(b)
Figure 4(d)

FASTENER

FIELD OF THE INVENTION

The present invention relates to fasteners and in particular to fasteners suitable for use with budding products.

The invention has been developed primarily for use as fastener for building cladding sheets and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Fasteners, such as screws have been used for many years to permanently or temporarily fasten two or more materials together. When fastening materials together with screws, the face of the head of the screw usually remains visible to the end user. In many instances, this is not aesthetically pleasing for the end user. Accordingly, it often desired to hide screw heads by various means. Most commonly this can be achieved by filling over the screw head with wall filler, or similar compound specifically designed for this purpose, allowing the filler to dry and then sanding the area. Usually the filled area and surrounding area are painted after filling the screw heads. Unfortunately once the area has been painted, location of screw fasteners and/or removal of screws to unfasten materials is not easily possible, particularly if the fastener head has been obscured or hidden by means of filler material and/or paint. Furthermore, removal of screws in such installations generally cannot be achieved without damage to the area and possibly the installation.

Whilst the above procedure is effective in hiding screw heads used to secure unfinished building materials, it is generally not effective in hiding screw heads fastened into pre-finished material, for example, pre painted materials. In some instances, it is known to colour match screw heads to surrounding colour. However, for a manufacturer, this means that large stock holdings in a large variety of colours are required to be able to meet consumer demands.

Location of screw fasteners is easier for prefinished screws than for filled and over coated installations, but removal of prefinished fasteners risks damaging the finish and does not allow for location of fastening points or removal of the fasteners.

OBJECT OF THE INVENTION

It is an object of the present invention to provide an improved fastening system that is easy to install, can be colour matched to its surroundings and may be easily located and removed if required.

SUMMARY OF THE INVENTION

According to the invention there is provided an improved fastening system suitable for use with building elements comprising;

a screw element comprising a shank member having a first end, a second end and a thread positioned along at least a portion of the shank member intermediate the first and second ends, the screw element further comprising a piercing tip at the first end of the shank member and a head at the second end of the shank member, the head of the screw comprising a first recess for releasably engaging an instrument of rotation and a second recess extending from the first recess into the shank member for releasably engaging a shank portion of a cover member; and the cover member comprising a capping portion having a first face, a second face and an edge member intermediate the first face and second face, the cover member further comprising a shank portion extending substantially orthogonally from the first face of the capping portion remote from the second face, the shank portion being releasably engagable with the second recess of the screw element.

According to the invention there is further provided a screw element comprising a shank member having a first end, a second end and a thread positioned along at least a portion of the shank member intermediate the first and second ends, the screw further comprising a piercing tip at the first end of the shank member and a head at the second end of the shank member, the head of the screw element comprising a first recess for releasably engaging an instrument of rotation and a second recess extending from the first recess into the shank member for releasably engaging a shank portion of a cover member.

According to the invention there is further provided a cover member comprising a capping portion having a first face, a second face and an edge member intermediate the first face and second face, the cover member further comprising a shank portion extending substantially orthogonally from the first face of the capping portion remote from the second face, the shank portion being releasably engagable with the second recess of the screw element.

The advantage of the fastening system of the present invention is that the exposed face of the head of the screw element is disguised to the end user by means of the cover member. The cover member minimises access of weather elements, such as rain, to the interface between the fastening means and the building materials.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

It is to be understood that the terms 'cover member' and 'capped pin' are used interchangeably throughout the specification to describe the 'cover member' of the invention which inserts through the first into the second recess of the screw element of the invention.

In a further embodiment of the invention, the second recess is sized and shaped to securely hold the shank portion of the cover member in place. In one embodiment of the invention the second recess extends a sufficient distance into the interior of the shank member of the screw element to securely hold the cover member in place. It is preferable that the cover member is held in the shank portion such that an external force is applied to the cover member to release the cover member from engagement with the second recess of the screw element The advantage of this is that accidental dislodgement of the cover member from the screw element is prevented.

In a further embodiment of the invention the second recess extends into the interior of the shank member of the screw element. In one embodiment of the invention the second recess is in the form of a cylindrical recess within the shank member, wherein the cylindrical recess has a continuous interior surface within the shank member and a closed end remote from the first recess. It is to be understood that the second recess can adopt any suitable shape known to the person skilled in the art which allows the second recess to accommodate the shank portion of the cover member. Optionally in a further embodiment of the invention the second recess extends within the shank element approximately one quarter of the overall distance from the face of the screw element to the tip of the screw element.

In a further embodiment of the invention, each of the first and second recess have an opening at one end of the recess and a base at the opposing end of the recess remote from the opening, the first and second recess being formed adjacent to each other wherein at least a portion of the base of the first recess is contiguously formed with the opening of the second recess.

In a further embodiment of the invention the screw element comprises a cylindrical shank member.

In a further embodiment of the invention the screw element comprises a tapered shank member.

In a further embodiment of the invention the screw element comprises a threaded portion on at least a portion of the shank member. In one embodiment the threaded portion comprises a helical ridge threaded portion. In a further embodiment of the invention, the threaded portion comprises a pitched threaded portion.

In a further embodiment of the invention, the capping member is sized and shaped such that it covers the exposed face of the screw element. In one embodiment of the invention, the second face of the capping portion has a convex shape such that the second face is curved outwards relative to the shank portion of the cover member.

In a further embodiment of the invention, the shank portion further comprises an angled portion remote from the capping portion. Conveniently the angled portion extends from the shank portion at a predetermined angle relative to the shank portion. In this embodiment of the invention the angled portion extends from the shank portion at an angle such that the lineal distance between any pair of opposing points on a pair of spaced apart parallel longitudinal axes is greater than the diameter of the second recess of the screw element, wherein the first longitudinal axis extends from the capping member to the section of the angled portion closest to the edge member of the capping portion and the second longitudinal axis extends from the capping portion to the edge of the shank portion remote from the tip of the angled portion.

Thus, when the cover member is in use, the angled portion is inserted into the second recess of screw element and pressure is applied to the cover member to urge the angled portion into the second recess. Due to the larger diameter, the angle between the shank portion and the angled portion is altered such that the angled portion is forced into engagement with the interior surface of the second recess of the screw element, thereby forming a resilient bias within the second recess and retaining the cover member within the screw element.

In one embodiment of the invention, the shank portion and/or angled portion further comprise at least one retaining means. In a further embodiment of the invention, the retaining means are removeably attached to the screw element. In an alternative embodiment the retaining means are integrally formed with the screw element. Optionally, in a further embodiment of the invention, the retaining means are made of the same material as the screw element. In an alternative embodiment of the invention the retaining means are made from any suitable material known to the person skilled in the art that will provide the necessary properties to achieve the functional requirements of the retaining means.

In a further embodiment of the invention, the retaining means is in the form of at least one protrusion or appendage attached to the end of the shank portion or angled portion remote from the capping portion. Conveniently, where a plurality of retaining means are provided the protrusions or appendages are spaced apart from each other. In some instances, it is understood that it is preferable for the protrusions or appendages to be equally spaced apart from each other.

In a further embodiment of the invention the shaped protrusion or appendage is in the form of a curved or angular projection. Preferably, the retaining means are shaped such that the shank portion of the cover member is secured within the second recess of the screw element by means of a friction fit or a resiliently biased fit.

In a further embodiment of the invention, the retaining means or protrusion is disposed axially on or about the shank portion.

Optionally, in a further embodiment of the invention, the retaining means or at least one protrusion is disposed circumferentially on or about the shank portion.

In a further embodiment of the invention, the shank portion of the cover member comprises a weakened or friable section intermediate the shank portion and the capping portion. Conveniently the weakened area or section allows for the capping portion of the cover member to become separated from the shank portion when an external force is applied to remove the cover member from the screw element. The advantage of this is that the cover member further acts as a securing means to prevent unwanted removal of the screw element when in being used to secure a building material to a building substructure.

In a further embodiment of the invention, the second face of the capping member is surface treated, for forming a decorative coating. Conveniently the surface treatment is selected from at least one of the group comprising etching, abrading, anodizing, galvanizing, irradiating, polishing, and embossing.

In a further embodiment of the invention, the surface treatment comprises a surface coating. In another embodiment of the invention, the surface coating is applied as paint.

According to the invention, there is provided a method for installing an improved fastener comprising the steps of;
(a) providing at least a first and a second material to be releasably fastened together;
(b) positioning a first material in a user selected position, the first material at least partially covering at least a section of the second material;
(c) providing a screw element comprising a shank member having a first end, a second end and a thread positioned along at least a portion of the shank member intermediate the first and second ends, the screw further comprising a piercing tip at the first end of the shank member and a head at the second end of the shank member, the head of the screw comprising a first recess for releasably engaging an instrument of rotation and a second recess extending from the first recess into the shank member for releasably engaging a shank portion of a cover member;
(d) providing a cover member comprising a capping portion having a first face, a second face and an edge member intermediate the first face and second face, the cover member further comprising a shank portion extending substantially orthogonally from the first face of the capping portion remote from the second face, the shank portion being releasably engagable with the second recess of the screw element;

(e) releasably engaging the instrument of rotation with the first recess;

(f) driving the screw through the at least two materials to be releasably engaged until the face of the screw is co-planar with a first surface of the first material; and (g) placing the cover member in position by inserting the shank portion of the cover member into the second recess in the head of the screw and applying pressure to urge the edge member of the capping portion into physical contact with the first surface of the first material.

In a further embodiment of the invention, at least one of the first and second materials is a façade panel. In a further embodiment of the invention the façade panel is a fibre cement panel.

BRIEF DESCRIPTION OF THE DRAWINGS

The invention will now be described more particularly with reference to the accompanying drawings, which show by way of example only various embodiments of the façade system of the invention, In the drawings;

FIG. 2 (a) is a cross-sectional side view of a screw of the improved fastener of FIG. 1(a) being installed into a panel according to the invention;

FIG. 2(b) is a cross-sectional side view of the screw of FIG. 2(a) in an installed position together with a capped pin of the improved fastener of FIG. 1(a), FIG. 2(c) is a cross-sectional side view of the improved fastener comprising the screw and cover member of FIG. 1(a) in an installed position in a panel according to the invention;

FIG. 3(a) is a cross-sectional side view of a cover member according to a second embodiment of the invention;

FIG. 3(b) is a sectional side view of the screw element according to the second embodiment of the invention;

FIG. 3(c) is an end view of the cover member of FIG. 3(a),

FIG. 3(d) is an end view of the screw element of FIG. 3(b);

FIG. 4(a) is a cross-sectional side view of a cover member according to a third embodiment of the invention;

FIG. 4(b) is a sectional side view of a screw element according to a third embodiment of the invention;

FIG. 4(c) is an end view of the cover member of FIG. 4(a);

FIG. 4(d) is an end view of the screw element of FIG. 4(b);

DETAILED DESCRIPTION OF THE INVENTION

Figure 1A:
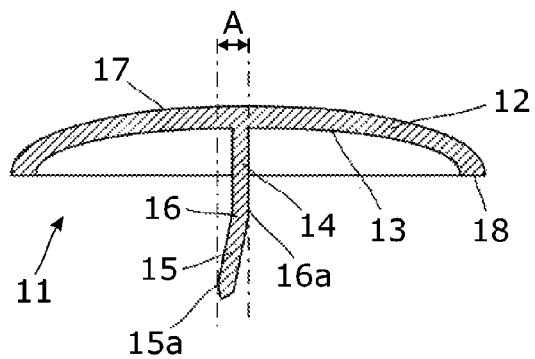
FIG. 1(a) is a cross-sectional side view of a cover member according to a first embodiment of the invention.
Figure 1C:
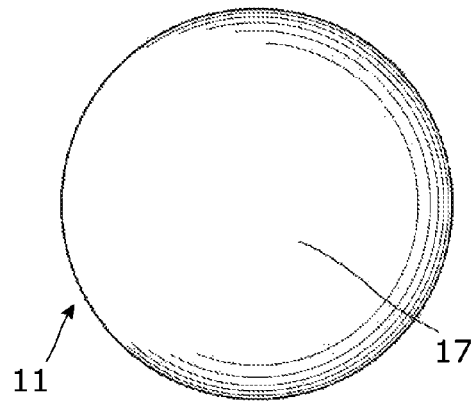
FIG. 1(c) is an end view of the cover member of FIG. 1(a)
Figure 1B:
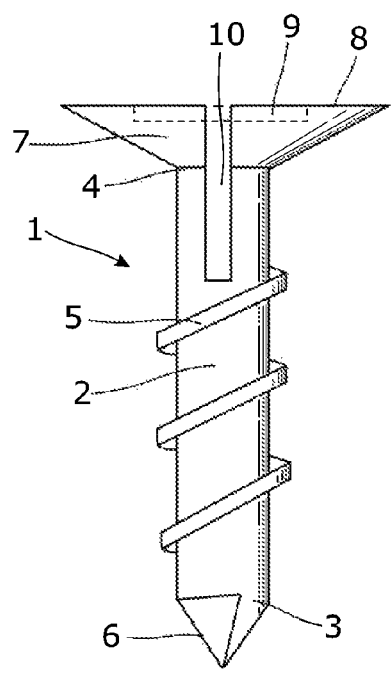
FIG. 1(b) is a sectional side view of a screw element according to a first embodiment of the invention.
Figure 1D:
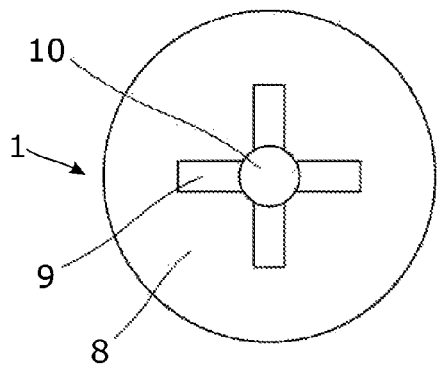
FIG. 1(d) is an end view of the screw element of FIG. 1(b)

Referring now to the drawings and specifically FIGS. 1(a) to 1(d), 3(a) to 3(d) and 4(a) to 4(d), there is shown three embodiments of an improved fastening system according to the invention. It is to be understood that throughout the detailed description of the invention, the features of the invention that are common to each embodiment have substantially the same reference numeral. The reference numerals are prefixed with one or more further digits to indicate the embodiment of the invention being referred to.

Screw element 1 comprises a shank member 2 having a first end 3 and a second end 4. In the embodiments shown the first end 3 is provided with a piercing tip 6 and the second end 4 is provided with a screw head 7. Screw head 7 has an exterior face 8 positioned remote from the shank member 2. Exterior face 8 is provided with a first recess 9 for releasably engaging an instrument of rotation such as a screwdriver and a second recess 10 for releasably engaging shank portion 14 of cover member 11. The second recess 10 extends from the first recess 9 into the interior section of shank member 2. A screw thread 5 is positioned on the external surface of the shank member 2 intermediate the first and second ends 3 and 4. In the embodiment shown the first recess has a cruciform shape, which accommodates a Philips™ head type screwdriver. The second recess 10 is in the shape of a cylindrical recess which has a continuous internal wall and a closed end remote from opening extending from the first recess 9.

Cover member 11 comprises a capping portion 12 and a shank portion 14. The capping portion 12 has a first face 13, second face 17 and an edge member 18 intermediate the first face 13 and second face 17 such that the first face 13 is spaced apart and separate to the second face 17. The shank portion 14 extends substantially orthogonally from the first face 13 of capping portion 12. The shank portion 14 of the cover member 11 is sized and shaped such that it is releasably engagable with the second recess 10 of the screw element 1. In use, the second face 17 comprises the outermost portion of the cover member 11 which is visible when the cover member 11 is engaged with the screw element 1.

Referring now specifically to the cover member 11 shown in FIG. 1(a), shank portion 14 is further provided with an angled portion 15 remote from the capping portion 12. The angled portion 15 extends from the shank portion 14 at a predetermined angle 16 relative to the shank portion 14. In this embodiment of the invention the angled portion 15 is angled such that the lineal distance A between any pair of opposing points on the longitudinal axes (shown in dotted lines on FIG. 1(a)) extending from (a) the capping member 12 to the section of the angled portion 15a closest to the edge member 18 of the capping portion 12 and (b) the capping portion 12 to the edge of the shank portion 16a remote from the tip of the angled portion is greater than the diameter of the second recess 10 of the screw element.

In use, the angled portion 15 is inserted into the second recess 10. Pressure is then applied to the second face 17 of the cover member 11 to urge the angled portion 15 into the second recess 10. In performing this action, angle 16 between the shank portion 14 and the angled portion 15 is altered such that the angled portion 15 is biased towards the interior surface of the second recess 10. When the angled portion 15 is biased into this position, an external force must be applied to overcome the bias in order to remove the cover member 11 from the screw element 1.

Referring now specifically to FIG. 3(a), there is shown a second embodiment of the cover member 311. In the embodiment shown, the shank portion 314 is provided with a plurality of projections or protrusion attached to or projecting from the end of the shank portion 314 remote from the capping portion 312. In the embodiment shown, the projections are axially aligned with the shank portion 314. Referring to FIG. 4(a), there is shown a third embodiment of the cover member 411. In this embodiment of the invention, the projections or protrusions are equally spaced apart from each other and circumferentially disposed on or about the shank portion 414.

In both the second and third embodiments of the cover member 311, 411, the projections are shaped such that the shank portions 314, 414 of cover members 311, 411 are secured within the second recess 310, 410 of the screw element 301, 401 by means of a friction or resiliently biased fit.

Referring now to FIG. 3(c), the second surface 317 of cover member 311 has been finished with a decorative surface finish. It is understood that the second surface of the cover member may require some kind of pre-treatment, for example, etching, abrading, irradiating, and the like surface treatment prior to finishing in order to provide a suitable surface to enable adequate adhesion of an applied decorative finish such as a paint or transfer print.

In some instances, the shank portion 14 of the cover member 11 is designed with a weakened or friable section where the shank portion 14 projects from the capping portion 12 of the cover member 11. In the instance where the shank portion 14 is retained within the second recess 10 of the screw element 1, the weakened area or section allows for the capping portion 12 of the cover member 11 to become separated from the shank portion 14 in the event an external force is applied to remove the cover member 11 from the screw element 1. The advantage of this is that the cover member 11 further acts as a securing means to prevent unwanted removal of the screw element 1 when in being used to secure a building material to a building substructure.

Referring now to FIGS. 2(a) to 2(c), the use of the improved fastener to fasten a building material to a building substructure is shown. Optionally all surfaces are prepared by cleaning or similar prior to installation. The piercing tip 206 of the screw element is positioned on a desired fastening location 220 on building material 230. An instrument of rotation such as a screwdriver is positioned so that the blade 240 releasably engages at least a portion of first recess 209 in screw head 207. Rotational energy is applied to screwdriver blade 240 causing piercing tip 206 to penetrate building material 230 at or adjacent the desired fastening location 220. As force is continually applied to the screwdriver blade, the shank member 202 of the screw element of the invention is progressively driven into building sheet 230.

Referring now to FIG. 2(b), building sheet 230 is fastened to the building substructure 232 via the screw element of the invention. Shank member 202 of the screw element has been driven in until face 208 of screw head 207 is level or co-planar with surface 231 of building material 230. At this stage, the fastening location is easily identified because face 208 is visible and unprotected. In many instances the colour of the screw element will contrast with that of surface 231 of building material 230. In FIG. 2(b) cover member 211 is shown adjacent face 208, ready to be installed. In order to install the cover member 211, the angled portion 215 of the shank is inserted into the second recess 210 of the screw. Pressure is applied to second surface 212 of cover member 211, which forces the angled portion 215 of the shank portion 214 further into the second recess 210. The angled and shank portions 215, 214 respectively of cover member 211 are forced into the second recess 210 of the screw element until edge member 218 is brought into physical contact with surface 231 of building material 230. As the shank portion 214 of the cover member 211 is forced into second recess 210, the angle of bend 216 between shank portion 214 and angled portion 215 is altered and results in the formation of a resiliently biased spring. The cover member 211 is held in position because of the resistance fit of the resiliently biased spring within second recess 210.

Referring now to FIG. 2(c), there is shown a completed installation, with cover member 211 installed and in place. Once installed, the diameter of the capping member 212 is sized and shaped to completely cover the screw face 208. Edge member 218 of cover member 211 is in close physical contact with surface 231 of building material 230 and further acts to minimize contact of environmental agents with the screw 200. Once installed, the capped pin covers face 208 of screw 200 and serves to obscure or hide the fixing locations.

The exterior surface of cover member 211 may be surface treated by one or more surface treatment processes to provide an aesthetic decorative finish. The surface treatment may be one or more of etching, abrading, anodizing, galvanizing, irradiating, polishing, and embossing. In some cases, the surface treatment may include a decorative paint finish that is matched to a paint colour and other features, such as gloss level and texture, of a prefinished building material.

Figure 5A:
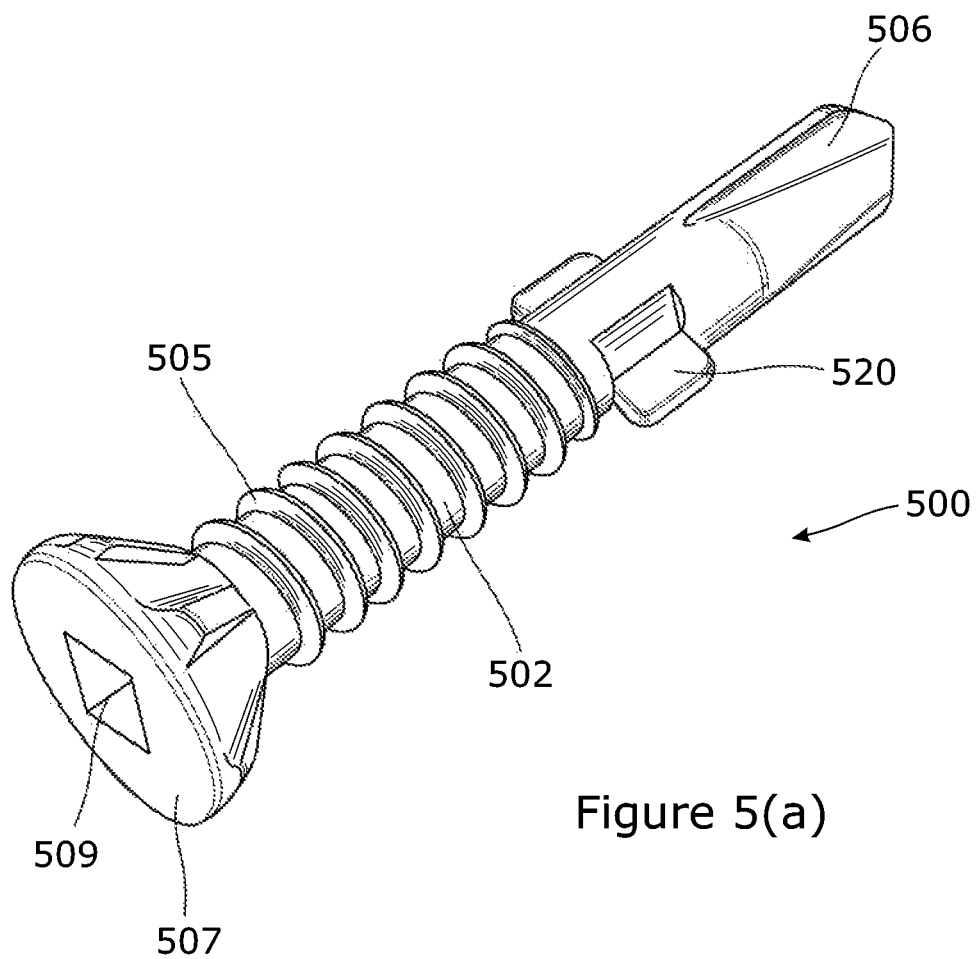
FIG. 5 (a) is a perspective view of a screw element according to a fourth embodiment of the invention.
FIG. 5(b) is an end view of the screw element of FIG. 5(a)
Figure 5B:
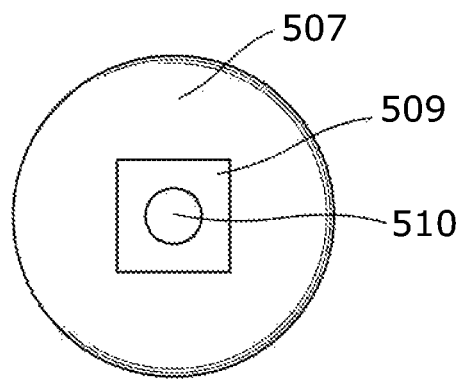

Referring now to FIGS. 5(a) and 5(b), there is shown a further embodiment of the screw element 500 of the invention. As before, screw element 500 comprises a shank member 502 having a first end and a second end. The first end of screw element 500 is provided with a piercing tip 506 and the second end is provided with a screw head 507. Screw head 507 is provided with a first recess 509 for releasably engaging an instrument of rotation, in this instance a square key and a second recess 510 for releasably engaging a shank portion of a cover member of the invention. The second recess 510 extends from the first recess 509 into the interior section of shank member 502. The diameter of second recess 510 is much smaller than that of first recess 509. A screw thread 505 is positioned on the external surface of the shank member 502 intermediate the first and second ends. The shank member 502 is also provided with wings 520 which act to further secure the screw element 500 in place when in use, particularly when being used with composite building material.

Figure 6:
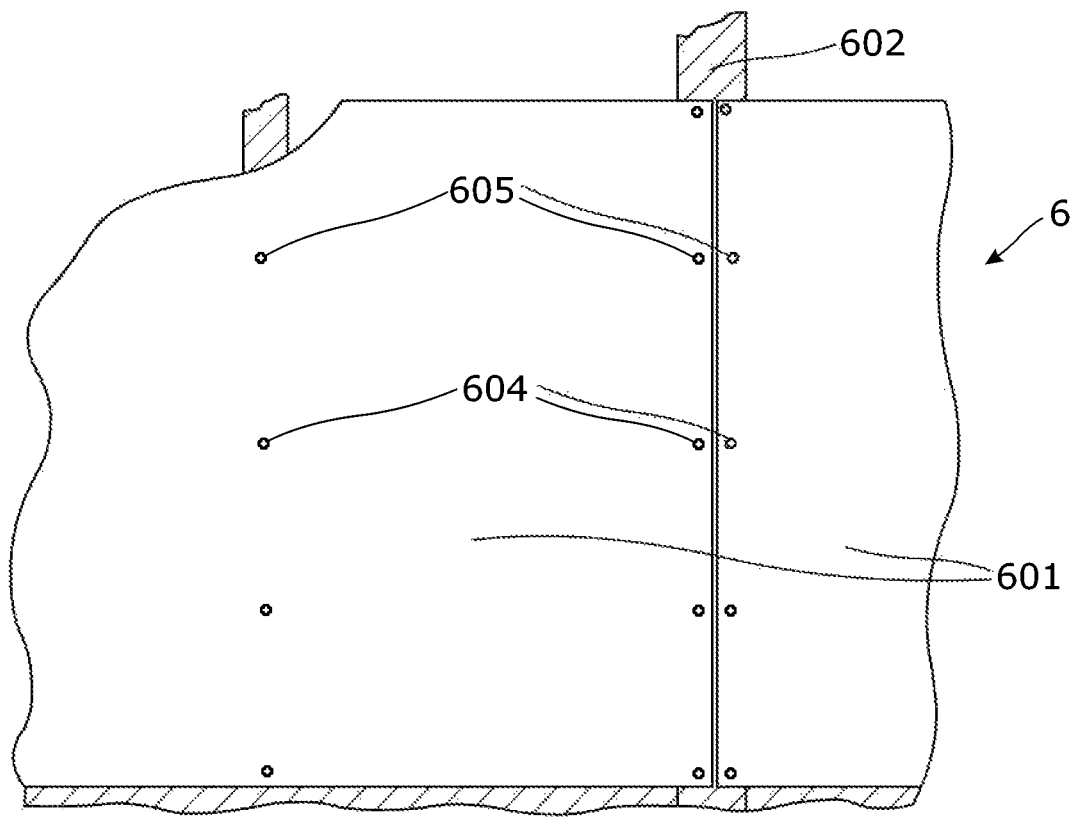
FIG. 6 is a front view of a section of a wall section showing a panel attached to building substructure by means of the improved fastener of the invention.

FIG. 6 shows an improved fastener system 6 according to the invention in an installed position, where at least one building material 601 is shown fastened to a building substructure 602. Cover members have been installed to complete the wall construction at that fastening location. Also shown in FIG. 6, are partially completed fastening locations 604, 605 where the screws have been installed but each has not yet had its respective cover member (unshown) installed. If, for any reason, fasteners need to be removed from a completed wall installation, the capped pins can be removed by levering the cap away from the building material surface. Levering action will overcome the resiliently biased retaining means or angled portion on the shank portion and allow the shank portion to be withdrawn from second recess of the screw element. This can be done with substantially no damage to any surface finish on the building material, which is important if the building material has an expensive or high quality surface finish factory applied, which cannot be easily repaired on site.

It will be appreciated that the illustrated improved fastener is easy to install, can be colour matched to its surroundings to minimize visibility and may be easily located and removed if required.

It will of course be understood that the invention is not limited to the specific details described herein, which are given by way of example only, and that various modifications and alterations are possible within the scope of the invention as defined in the appended claims.

The invention claimed is:

1. An improved fastening system suitable for use with building elements comprising;
    a screw element comprising a shank member having a first end, a second end and a thread positioned along at least a portion of the shank member intermediate the first and second ends, the screw element further comprising a piercing tip at the first end of the shank member and a head at the second end of the shank member, the head of the screw comprising a first recess for releasably engaging an instrument of rotation and a second recess extending from the first recess into the shank member for releasably engaging a shank portion of a cover member; and a cover member comprising a capping portion having a first face, a second face and an edge member intermediate the first face and second face, the cover member further comprising a shank portion extending substantially orthogonally from the first face of the capping portion remote from the second face, the shank portion comprising an angled portion remote from the capping portion, the shank portion being releasably engagable with the second recess of the screw element;

wherein the angled portion extends from the shank portion at a predetermined angle relative to the shank portion such that the lineal distance between any pair of opposing points on a pair of spaced apart parallel longitudinal axes is greater than the diameter of the second recess of the screw element, wherein the first longitudinal axis extends from the capping member to the section of the angled portion closest to the edge member of the capping portion and the second longitudinal axis extends from the capping portion to the edge of the shank portion remote from the tip of the angled portion.

2. An improved fastening system claimed in claim 1, wherein the second recess of the screw element is in the form of a cylindrical recess within the shank member, wherein the cylindrical recess has a continuous interior surface within the shank member and a closed end remote from the first recess.

3. An improved fastening system as claimed in claim 2, wherein each of the first and second recess of the screw element have an opening at one end of the recess and a base at the opposing end of the recess remote from the opening, the first and second recess being formed adjacent to each other wherein at least a portion of the base of the first recess is contiguously formed with the opening of the second recess.

4. An improved fastening system as claimed in claim 1, wherein the screw element comprises a cylindrical shank member or a tapered shank member.

5. An improved fastening system as claimed in claim 1, wherein the threaded portion of the screw element comprises a helical ridge threaded portion or a pitched threaded portion.

6. An improved fastening system as claimed in claim 1, wherein the capping member of the cover member is sized and shaped such that it covers a face of the head of screw element.

7. An improved fastening system as claimed in claim 1, wherein the second face of the capping portion of the cover member has a convex shape such that the second face is curved outwards relative to the shank portion of the cover member.

8. An improved fastening system as claimed in claim 1, wherein the shank portion of the cover member further comprise at least one retaining means.

9. An improved fastening system as claimed in claim 8, wherein the retaining means of the cover member comprise at least one protrusion or appendage attached to the end of the shank portion remote from the capping portion.

10. An improved fastening system as claimed in claim 9, wherein the retaining means of the cover member are disposed axially or circumferentially on or about the shank portion.

11. An improved fastening system as claimed in claim 1, wherein the shank portion of the cover member comprises a weakened or friable section intermediate the shank portion and the capping portion.

\* \* \* \* \*